United States Patent [19]

Bemos

[11] 4,057,285
[45] Nov. 8, 1977

[54] COLLAPSIBLE FOLDING BEDS FOR VEHICLES

[76] Inventor: Charles Bemos, 1213 Green St., N., New Port Richey, Fla. 33552

[21] Appl. No.: 710,293

[22] Filed: July 30, 1976

[51] Int. Cl.² .............................................. B60P 3/32
[52] U.S. Cl. ..................................... 296/23 H; 52/72
[58] Field of Search ................ 296/23 H, 23 R; 52/72

[56] References Cited

U.S. PATENT DOCUMENTS

| 2,676,839 | 4/1954 | La Coste | 296/23 H |
| 2,788,238 | 4/1957 | Baird | 296/23 H |

Primary Examiner—Philip Goodman
Attorney, Agent, or Firm—George B. Oujevolk

[57] ABSTRACT

The present invention provides for a folding bed in a vehicle with a top and a side to house the bed, a guide rail arrangement is provided in the vehicle side wall. A rectangular side wall is pivoted to the vehicle top, the bottom of said vehicle side wall extending outwards when the wall is outwardly pivoted. A rectangular bed frame having wires and outer sections is provided. The bed frame has a central boss with rollers which enter the guide rail arrangement. When the bed is in the collapsed position, the front section is received in a defined storage area under the vehicle.

1 Claim, 15 Drawing Figures

COLLAPSIBLE FOLDING BEDS FOR VEHICLES

BACKGROUND OF THE INVENTION

The present invention relates to a wall mounted outwardly extendable bed for recreational vehicles and more particularly to such a wall mounted bed which is easily placed in the rest position by a woman or child.

BRIEF REVIEW OF THE PRIOR ART

Numerous patents have been issued on extensions for trailers, mobile homes, and recreational vehicles among which are the following:

| Patent No. | Inventor | Date |
| --- | --- | --- |
| 2,788,238 | E. L. Baird | Apr. 9, 1957 |
| 3,290,085 | J. H. Damiani | Dec. 6, 1966 |
| 3,360,891 | S. E. Gardner | Jan. 2, 1968 |
| 3,463,538 | W. R. Koon | Aug. 26, 1969 |
| 3,508,781 | C. A. Anderson | Apr. 28, 1970 |
| 3,531,152 | F. J. Tyler | Sept. 29, 1970 |
| 3,558,180 | D. E. Algiro | Jan. 26, 1971 |
| 3,598,441 | J. H. Damiani | Aug. 10, 1971 |

Most of the foregoing devices suffer from difficulty in opening the bed, cut-the-finger hinges and snaps, protruding members providing a hard bed, and lack of proper storage space.

OBJECTS OF THE INVENTION

One object of the present invention is a folding bed which is a portion of a wall when closed. The closed position is used when the recreational vehicle is in motion.

Another object of the invention is to save energy (gasoline) by utilizing a smaller recreational vehicle to accomodate a car full of people, whereby normally without the folding beds, a recreational vehicle twice as long would be necessary.

Still another purpose of this invention is to provide emergency exits when the beds are full opened. The persons inside can exit to either side of the bed by opening a side panel from the inside.

Yet another object of the present invention is the time saving feature of the folding beds, a great efficiency factor, whereby they open and close instantly. Normally, without the folding beds, a great deal of time is taken up every evening to make up the beds. In the morning the same time is taken to put the sleeping quarters back to living quarters.

Furthermore, the invention contemplates beds which are economical to manufacture (a shorter recreational vehicle) with refinement and durability. A savings on materials and also on the labor costs is realized, mainly because of the inside space saved by this bed, on either side or both sides, when two beds are installed. Conventionally, the recreational vehicle whether a trailer or self-propelled, would have to be at least twice as long without the folding beds on the wall. Normally, the inside furniture is converted into sleeping quarters at night. The feature of the folding beds eliminates all this cumbersome furniture on the inside, therefore, there is a substantial cost savings and space savings.

Yet another feature of the folding beds is the weight saved when the folding bed is incorporated into the self-propelled or the conventional recreational vehicle trailer. This is realized because of the size being less than half of the conventional recreational vehicle on the inside, and on the length by eliminating the converting furniture.

This invention also contemplates an arrangement useful with conventional recreational vehicles either drawn by an auto or the self-propelled vehicle. These vehicle bodies are based with the improvements, primarily with the collapsible or folding beds and/or a framed, collapsible unit or member, specifically constructed for assembly as a part of a drawn or self-propelled vehicle.

This invention also contemplates a wall that opens to the outside with the collapsible bed opening to the outside at the same instant.

A further purpose of this invention is to give the recreational vehicle a compact, symmetrical, streamlined appearance after being used and especially when in motion.

Another deluxe feature of this invention is its practicability and usefulness at any time of the day, whether on the road or at the campgrounds or at rest areas on the highways, instant beds are made for short naps or rest period when on the road.

A still further purpose of this invention is to have a traveling vehicle with expandable portions of vertical space.

Another practical idea of this invention is during rain or unsettled weather, snow or any type of bad weather whereby you are forced to stop, expandable sides are manipulated from the inside, therefore all occupants are protected from weather elements during the transition of opening and closing of the folding beds.

A still further object of this invention is to keep the sleeping area of the recreational vehicle away from the living and cooking areas, thereby utilizing most of the floor area for other purposes rather than for sleeping areas as most conventional recreational vehicles do.

Another energy saving idea of this invention is as follows: Most conventional self contained recreational vehicles are 7 to 8 feet wide, thereby the driver has restricted rear view vision when on the highway. This space savings can be utilized by making the recreational vehicle with the collapsible beds to a 5½ or 6 foot wide vehicle, thus giving much better rear view vision for passing or passed cars.

Another energy and time saving feature of this invention is that the extruded part of the bed is automatically fully covered (no canvas), also, the stable side panels open automatically. This gives the occupants security against weather, intruders, etc. when open.

Still further uniqueness about this invention is the elimination of the cumbersome, convertible furniture entirely from the inside, thus saving a lot of space, weight, and cost of same.

Still another purpose of this invention is to provide comfortable quarters for traveling groups such as families with numerous children, church groups, camping groups, such as boys or girls, and also comfortable moving vehicles with sleeping quarters for the Services such as the Army and Marines, with the examples explained as follows: a 6 × 10 foot (size optional) fully self contained trailer (kitchen, toilet, etc.) will accomodate 4 persons easily, with a bed to each side. For each additional 5 foot in length with additional beds on each side will accomodate an additional four persons. Thus, a 25 foot vehicle, self contained would easily accomodate 16 adults.

Sports minded persons would enjoy this innovation. Since the fully self contained recreational vehicle is narrower and shorter, and light in weight, this will enable them to penetrate previously inaccessible areas with accommodations and provisions with good secure shelter.

Conservationists will more readily abide with the folding bed idea. They fully realize the energy saved on the materials. Since less material is needed to accomodate more persons, less energy is used to manufacture the necessary products.

The conserving of wood, metal, etc., is another prime innovation of this invention. A substantial savings in material such as wood and wood products will be realized (inside furniture is eliminated). Metal and related products would be used to a lesser extent since a smaller recreational vehicle would accommodate a greater number of persons.

The invention as well as other objects and advantages thereof will be more apparent from the following detailed description when taken together with the accompanying drawings, in which:

BRIEF DESCRIPTION OF THE DRAWINGS

FIG. 10a shows the roller used in FIG. 9a;

DETAILED DESCRIPTION

Shown in the invention is a trailer-type recreational vehicle 11 with a top 13, a rear end 15, a side door 17, and a side wall 18. On the right side of the vehicle is a side wall 19 which can swing out to about 45°. Side wall 19 is disposed over a bed frame 21 and has triangular side panels 23a, 23b. The extending and folding of the bed 25 is shown in FIGS. 1 through 8.

Side wall 19 has a top portion 27 which is pivoted to the top of the vehicle 11. This permits wall 19 to swing in and out to allow clearance for the bed 25.

Figure 1:
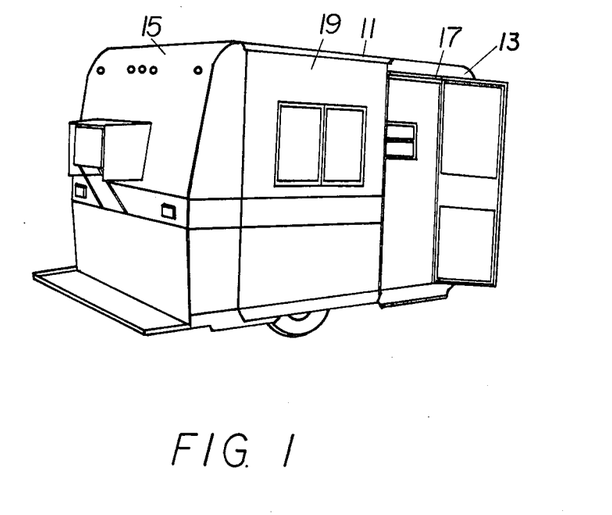
FIG. 1 shows a perspective view of a recreational vehicle with the invention contemplated herein at the side of the vehicle.
Figure 2:
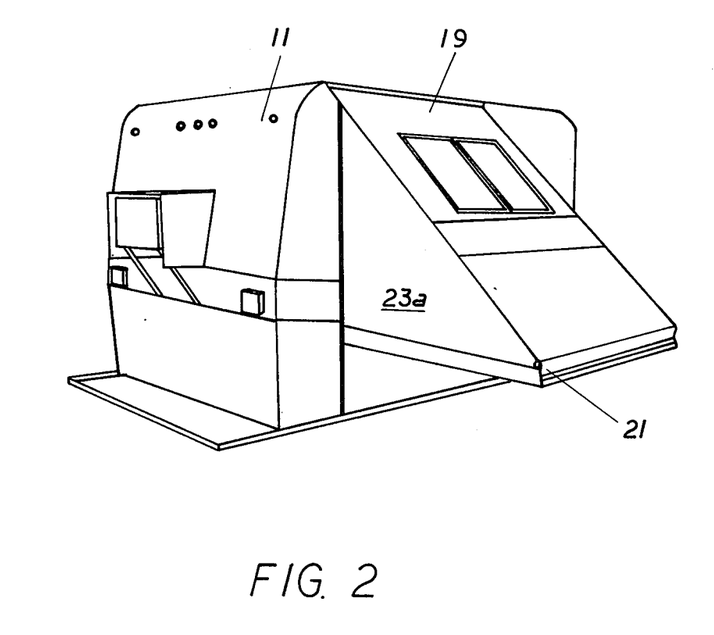
FIG. 2 illustrates in perspective how the recreational vehicle looks with the bed fully extended.
Figure 3:
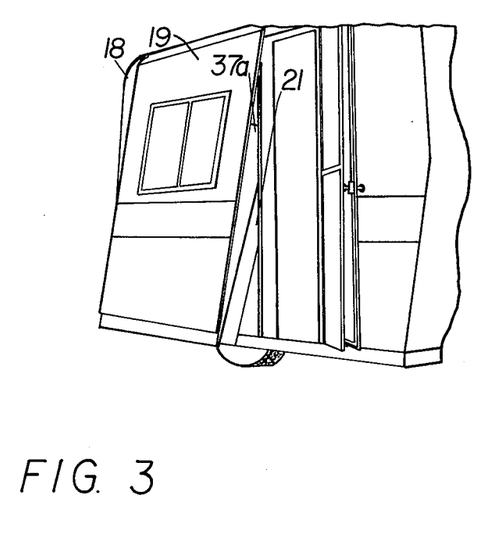
FIG. 3 begins the opening of the bed in perspective.
Figure 4:
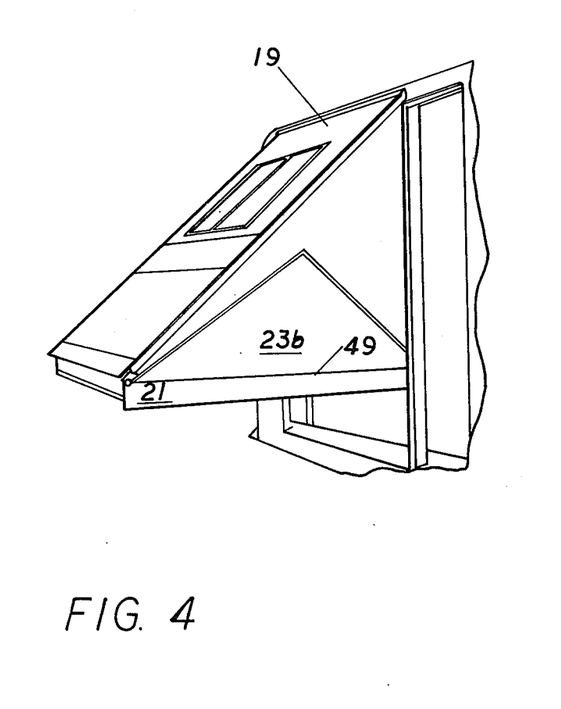
FIG. 4 provides from one side in perspective the bed already extended but with side panels still folded.
Figure 5:
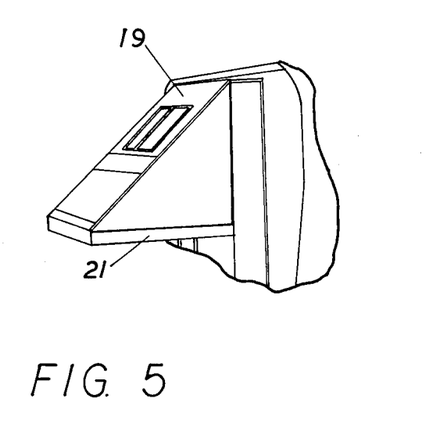
FIG. 5 has the bed fully opened and one inside panel in place.
Figure 6:
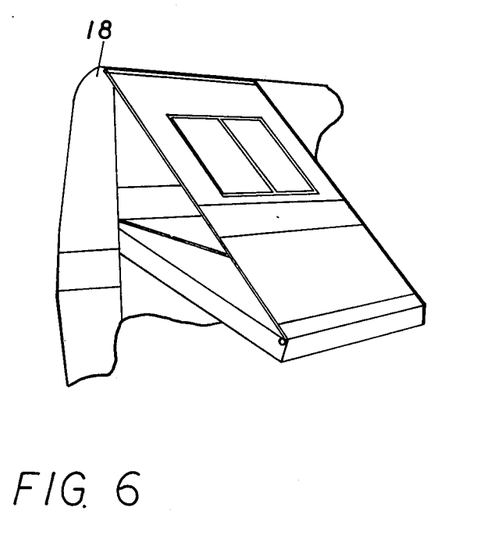
FIG. 6 presents a perspective view of a partly extended bed from the rear side of the vehicle.
Figure 7:
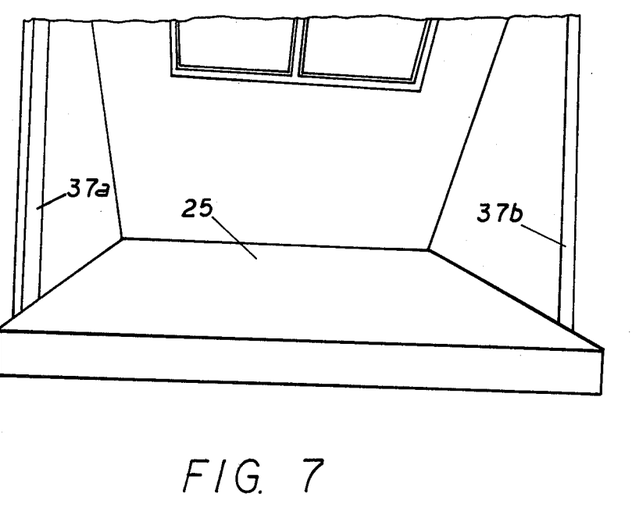
FIG. 7 shows the extended bed in perspective from within the vehicle.
Figure 8:
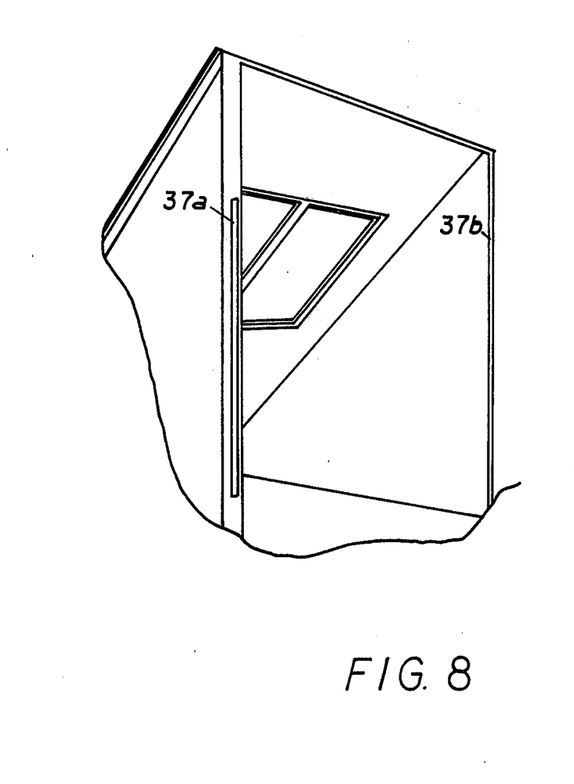
FIG. 8 is a side perspective view from within the vehicle of the extended bed.
Figure 9:
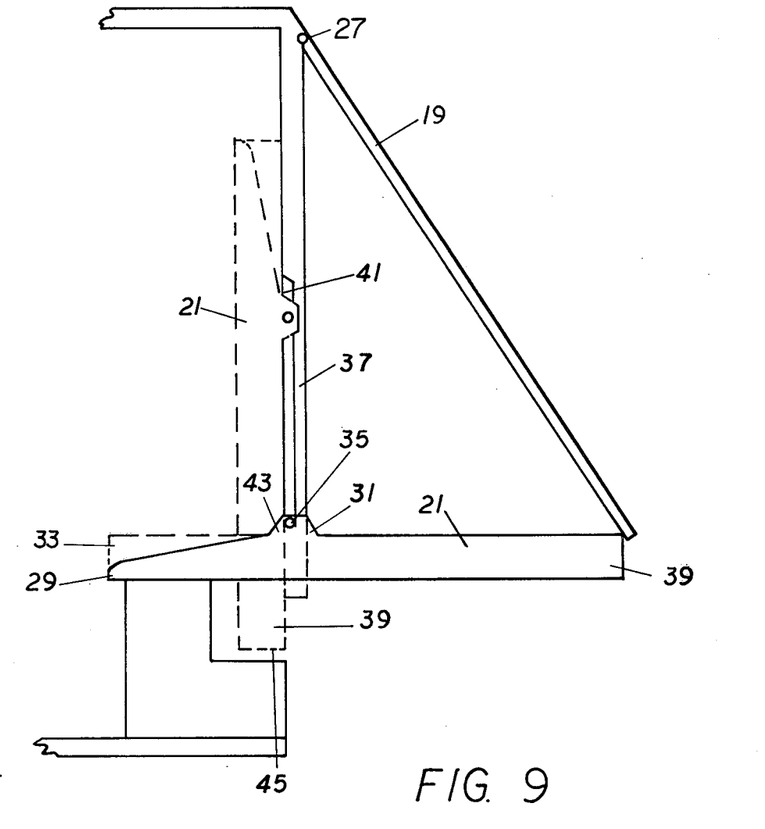
FIG. 9 depicts a sectional view of the bed in both the collapsed and extended position in dotted and solid lines.
Figure 9A:
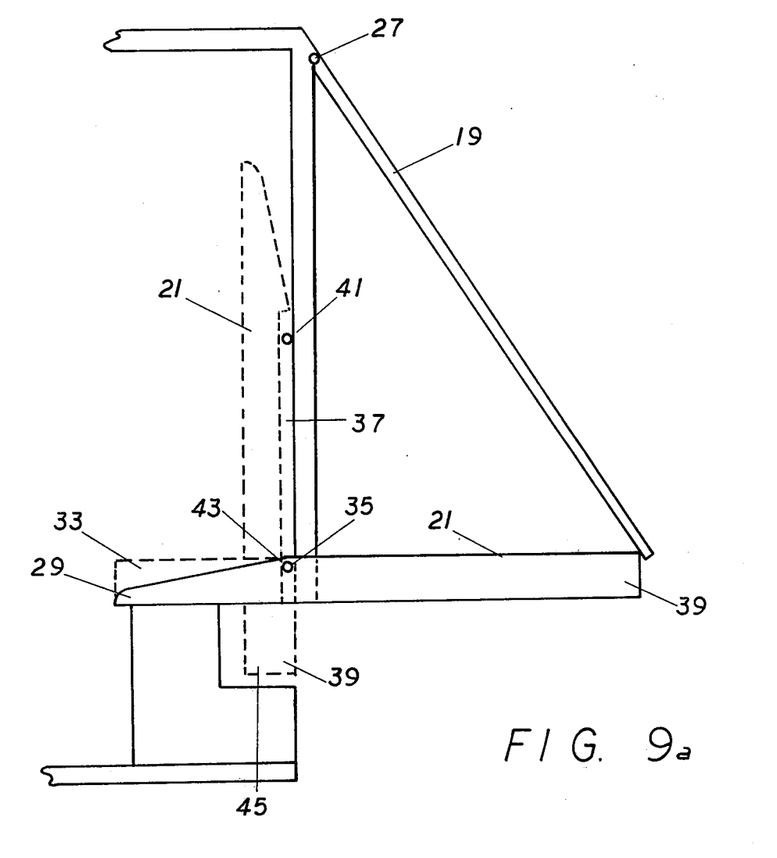
FIG. 9a presents a slightly different embodiment from that shown in FIG. 9.
Figure 10:
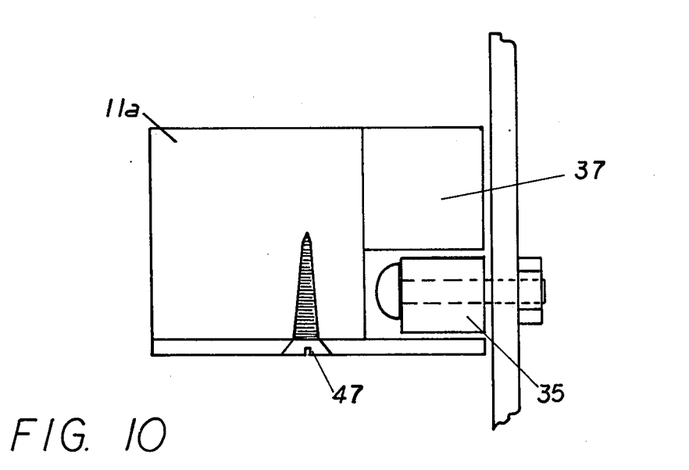
FIG. 10 illustrates a sectional view of a roller arrangement used herein.
Figure 10A:
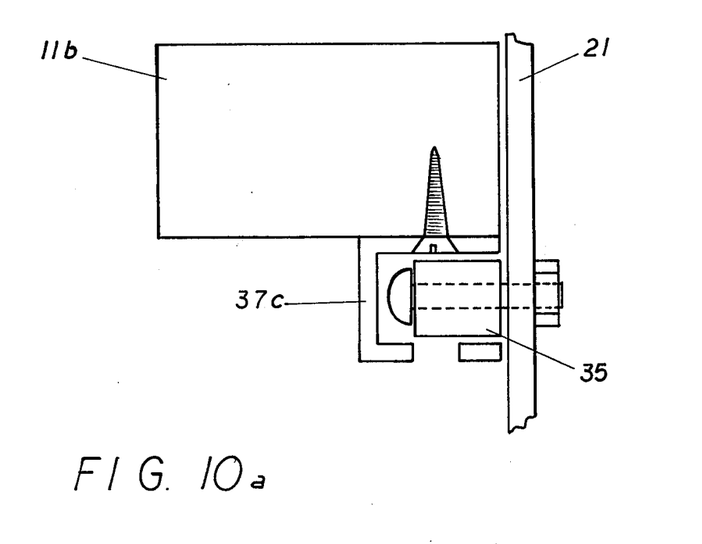

The bed frame 21 is of general rectangular configuration with a tapered inner section 29. Disposed over the frame is a foam mattress 33. The foam mattress 33 projects above the tapered inner section 29 so that there is a soft surface as one sits on the beds. A guide rail arrangement 37 is provided in the vehicle 11. The guide rail arrangement has a rear and front rail 37a, 37b. The rollers 35 will slide along the guide rail arrangement 37. As shown in FIG. 9a and FIG. 10a, the track 37c can be an aluminum channel U-shaped track with holes for screws, one hole on the outside to allow the screw to enter the other side for mounting to a stud 11b on the wall. The bed frame 21 has an outer section 39 which extends below the vehicle floor in the folded position. In this position the bed frame 21 is substantially vertical and the roller is about in the center of the rail arrangement. At this point there is an upper roller station 41 where the roller enters and comes to a state of rest, the boss 31 enters this station with the roller to open the bed, the frame 21 is pulled inwards slightly, removing the roller from the station. Pushing gently down on the roller will cause the frame 21 to pivot outwardly. Finally, the frame 21 takes the horizontal position and the roller 35 enters the lower roller station 43. At this point, the bed frame, the bed front section 39, extends out well past the vehicle door while the inner end section 29 is extending inside the vehicle. The vehicle 11 also has a bed storage area 45. This outer section is accommodated in the storage area. This storage area is of L-shaped cross-section, sized to accept the thickness of the bed.

The bed can be of fiber glass with a ⅝ inch diameter × ¾ inch roller held to the fiber glass bed frame by a ¼ inch bolt. The rails formed in the vehicle frame are 40 inches long with a ¾ inch opening for the roller.

Folded over the bed are side panels 28a and 28b. These panels are right triangular pieces, preferably fabric sewn to the bed frame by a seam 49. Thus, there are no hinges to cut the fingers of playfull children. These panels 23a, 23b fold one over the other and occupy a rectangular space in the vehicle forming a sort of window shade effect.

Figure 11:
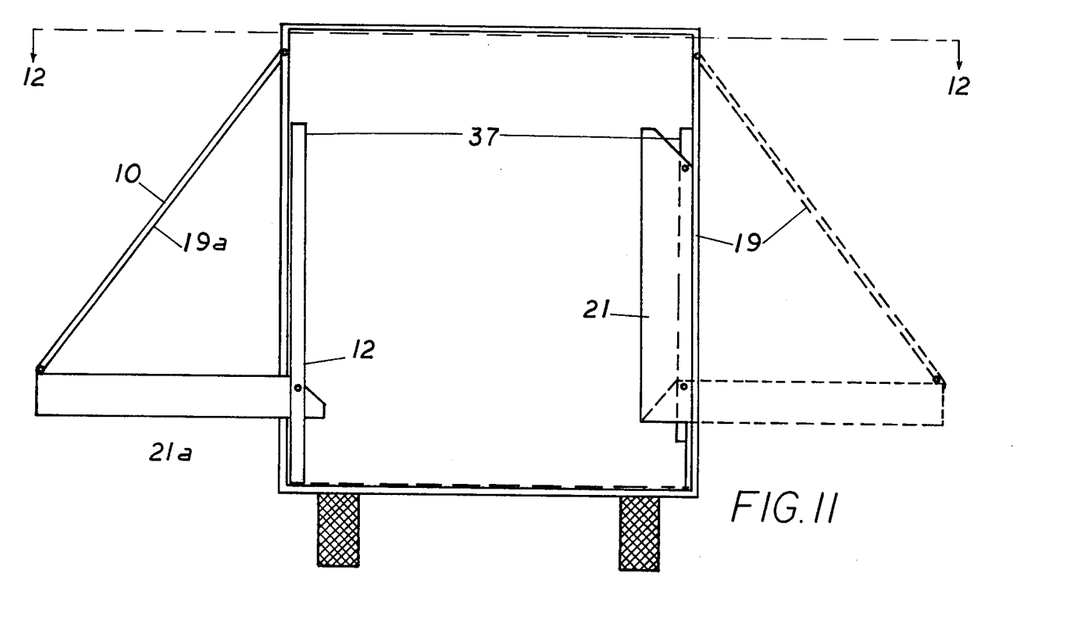
FIG. 11 is a theoretical rear view of the inventive concept using two beds.
Figure 12:
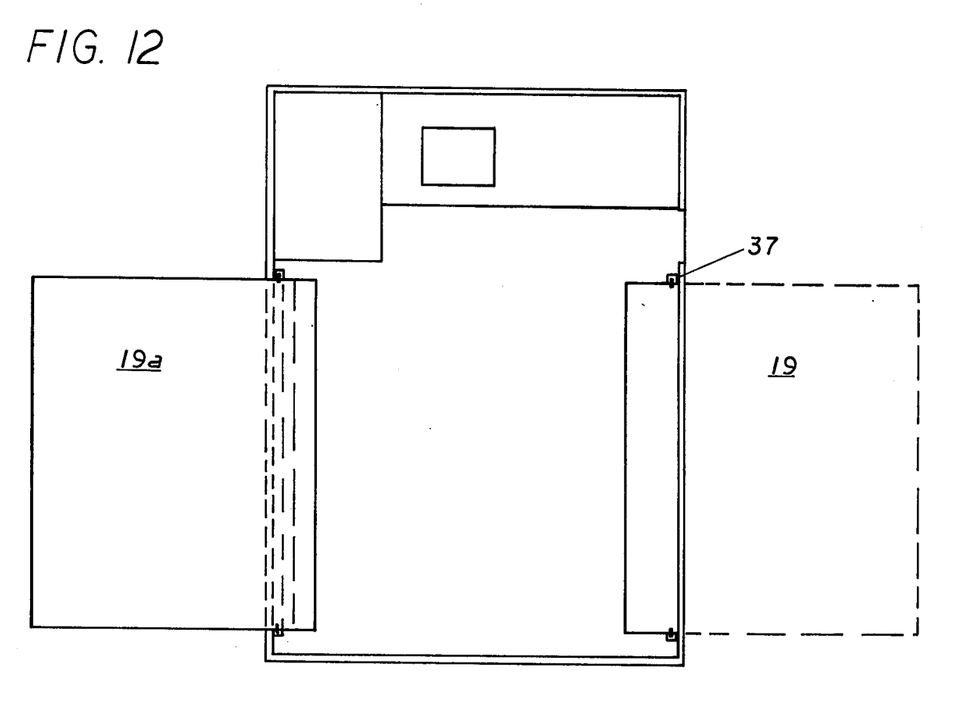
FIG. 12 is a theoretical view through the top of the vehicle along lines 12—12 of FIG. 11; and, FIG. 13 presents a view showing a two bed arrangement with one bed extending out lengthwise.

It is also possible to have two beds in a vehicle as shown in FIG. 11 and FIG. 12 which has bed frames 21 and 21a, and side walls 19, 19a.

Figure 13:
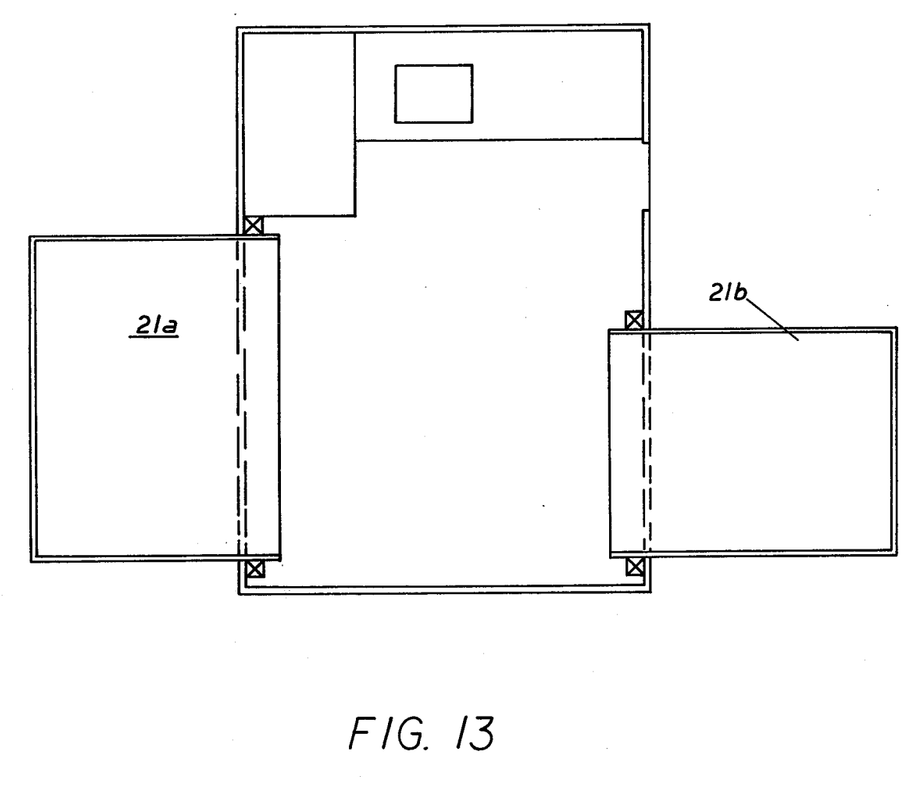

Furthermore, the longer side of the bed can either be parallel to the vehicle as in bed 21a or at right angles to the vehicle as shown in bed 21b.

It is to be observed therefore that the present invention provides for a folding bed in a vehicle 11 with a top 13 and a side 18, to house the bed, a guide rail arrangement 37 is provided in the vehicle side wall. A rectangular side wall 19 is pivoted to the vehicle top 13, the bottom of said vehicle side wall extending outwards when the wall is outwardly pivoted. A rectangular bed frame 21 having inner and outer sections 29, 39 is provided. The bed frame has a central boss 31 with rollers 35 which enter the guide rail arrangement 37. When the bed is in the collapsed position, the front section is received in a defined storage area 45 under the vehicle.

I claim:

1. In a vehicle (11) with a top (13) and a vertical side (18), a wall-mounted extendable bed arrangement comprising in combination:
   a. a rectangular aperture defined in said side with two opposed inner edges having first and second vertical guide rails (37) towards each of said inner edges, an upper roller holding station (41) defined at about the center of said rail arrangement, a lower holding station (43) at the bottom of said rail arrangement;

b. a rectangular flat side wall (19) pivoted to the vehicle top (13), and normally forming a flat flush outer surface with the vehicle side (18), the bottom of said side wall extending outwards when the said side wall is outwardly pivoted;

c. a rectangular bed frame (21) with longitudinal bed frame sides, having an inner section (29) designed to be disposed towards the inside of the vehicle and an outer section (39) desinged to extend out of the vehicle, said inner section being slightly tapered, said bed frame (21) being normally vertically disposed with the taper of said inner section extending upwards;

d. first and second rollers (35) coupled to said bed frame sides, and movingly locked into said guide rails for up and down movement therein said rollers resting at said upper station (41) where said bed frame (21) is vertically disposed;

e. a defined storage area (45) under said vehicle where said bed frame outer section (39) can be normally received when said bed frame is in the vertical position, said outer section (39) pivoting outwards as said rollers travel downwards and being in the horizontal position when said rollers enter said lower station; and f. foldable side panels (23a, 23b) of triangular shape attached to the sides of said frame, said side panels folding over the bed in collapsed position and sealing the vehicle when the bed is used.

\* \* \* \* \*